United States Patent
Tajiri et al.

(10) Patent No.: US 8,599,659 B2
(45) Date of Patent: Dec. 3, 2013

(54) OBJECTIVE LENS HOLDER, OBJECTIVE LENS DRIVING DEVICE AND OPTICAL PICKUP APPARATUS

(71) Applicants: Noboru Tajiri, Gunma (JP); Mitsuhiko Uchida, Gunma (JP); Shingo Matsuzaki, Gunma (JP)

(72) Inventors: Noboru Tajiri, Gunma (JP); Mitsuhiko Uchida, Gunma (JP); Shingo Matsuzaki, Gunma (JP)

(73) Assignee: SANYO Electric Co., Ltd, Moriguchi (JP)

( * ) Notice: Subject to any disclaimer, the term of this patent is extended or adjusted under 35 U.S.C. 154(b) by 0 days.

(21) Appl. No.: 13/659,556

(22) Filed: Oct. 24, 2012

(65) Prior Publication Data

US 2013/0107683 A1    May 2, 2013

(30) Foreign Application Priority Data

Oct. 28, 2011    (JP) ................................ 2011-236702

(51) Int. Cl.
*G11B 7/00* (2006.01)

(52) U.S. Cl.
USPC ................................... 369/44.14; 369/44.22

(58) Field of Classification Search
None
See application file for complete search history.

(56) References Cited

U.S. PATENT DOCUMENTS

| | | | | |
|---|---|---|---|---|
| 7,324,412 B2 * | 1/2008 | Im et al. | ..................... | 369/44.15 |
| 7,593,294 B2 * | 9/2009 | Nogami | ..................... | 369/44.14 |
| 7,814,505 B2 * | 10/2010 | Imai et al. | ..................... | 720/681 |
| 2004/0268373 A1 * | 12/2004 | Song et al. | ..................... | 720/683 |
| 2006/0077781 A1 * | 4/2006 | Yamada | ..................... | 369/44.14 |
| 2006/0077782 A1 * | 4/2006 | Yamada | ..................... | 369/44.14 |
| 2008/0253239 A1 * | 10/2008 | Kimura et al. | ............. | 369/44.17 |

FOREIGN PATENT DOCUMENTS

JP        2007-18573      1/2007

* cited by examiner

*Primary Examiner* — Paul Huber
(74) *Attorney, Agent, or Firm* — Morrison & Foerster LLP (57) ABSTRACT

Provided are an objective lens holder and the like which prevent a wire formed into tracking coils from being loosened. Tracking coils are respectively attached to bobbins provided to sidewalls of an OBL lens holder. In addition, a conducting wire hook portion is formed by projecting a part of a sidewall portion near one of the bobbins, and a conducting wire is hooked round this conducting wire hook portion. Similarly, another conducting wire hook portion is provided to a sidewall portion near another one of the bobbins, and the conducting wire formed into the corresponding tracking coil is hooked round this conducting wire hook portion. This prevents the conducting wire from being loosened.

4 Claims, 6 Drawing Sheets

OBJECTIVE LENS HOLDER, OBJECTIVE LENS DRIVING DEVICE AND OPTICAL PICKUP APPARATUS

This application claims priority from Japanese Patent Application Number JP 2011-236702 filed on Oct. 28, 2011, the contents of which are incorporated herein by reference in its entirety.

BACKGROUND OF THE INVENTION

1. Field of the Invention

The invention relates to an objective lens holder, an objective lens driving device and an optical pickup apparatus. Particularly, the invention relates to: an objective lens holder which includes conducting wire hook portions by which unwound parts of a wire wound into tracking coils are put in close contact with sidewall portions; an objective lens driving device; and an optical pickup apparatus.

2. Description of the Related Art

In an objective lens driving device in an optical head for optically reading or writing a signal from or to an optical disc, an objective lens holder (hereinafter referred to as an "OBL holder") to which an objective lens is attached is supported to be movable relative to an actuator frame. In addition, a focus coil and tracking coils, as well as tilt coils depending on the necessity, are mounted on the OBL holder; the effective areas of these driving coils are placed within predetermined magnetic fields formed by magnetic circuits; and thereby, the objective lens is driven in accordance with signals supplied to the driving coils.

Conventionally existing objective lens driving devices installed in optical pickup apparatuses include one described in Japanese Patent Application Publication No. 2007-18573 (hereinafter referred to as "Patent Document 1"). Referring to FIG. 3 and the like of Patent Document 1, first bobbin portions 7a, second bobbin portions 8a, 8b and third bobbin portions 8d are provided to a lens holder 4, and tracking coils 12 are formed by winding a wire around these bobbins.

SUMMARY OF THE INVENTION

When a wire is wound around the multiple bobbins continuously with the technique described in Patent Document 1, however, the wire laid along the surfaces of the lens holder is likely to be loosened, and therefore to be broken by a winding nozzle for winding the wire.

In addition, if the wire laid along the surfaces of the lens holder is loosened while the optical pickup apparatus is in use, the loosened wire is likely to disrupt the operation of the lens holder.

The invention has been made with the foregoing problems taken into consideration. An object of the invention is to provide: an objective lens holder capable of preventing the wire wound into the tracking coils from being loosened; an objective lens driving device; and an optical pickup apparatus.

An objective lens holder of the invention includes: sidewall portions continuing from a principal surface portion to which an objective lens is fixed; a first bobbin, a second bobbin, a third bobbin and a fourth bobbin projecting from the sidewall portions sideward; and a first tracking coil, a second tracking coil, a third tracking coil and a fourth tracking coil formed by winding a conducting wire around the respective bobbins. In the objective lens holder, the conducting wire is hooked round a conducting wire hook portion which is formed by projecting a part of the sidewall portion sideward near at least one of the first bobbin, the second bobbin, the third bobbin and the fourth bobbin.

Further, an objective lens driving device of the invention includes: the objective lens holder of the above configuration; and an actuator frame for movably supporting the objective lens holder.

Furthermore, an optical pickup apparatus of the invention includes the objective lens driving device of the above configuration which is installed in a housing.

BRIEF DESCRIPTION OF THE DRAWINGS

FIGS. 2A and 2B are plan views showing an objective lens driving device of the preferred embodiment of the invention; FIG. 2A is a plan view showing the objective lens driving device.

FIGS. 3A and 3B are views showing the objective lens holder of the preferred embodiment of the invention.

FIGS. 4A to 4E are views showing the objective lens holder of the preferred embodiment of the invention.

DESCRIPTION OF THE INVENTION

Figure 1:
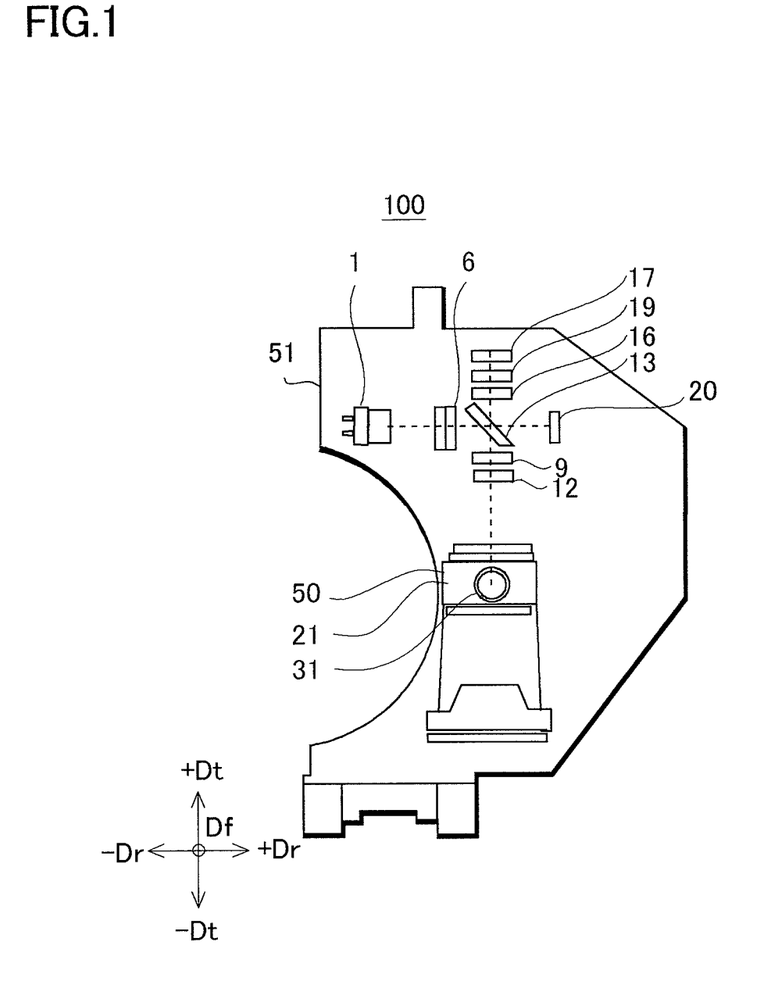
FIG. 1 is a plan view showing an optical pickup apparatus of a preferred embodiment of the invention.

A preferred embodiment of the invention will be described by referring to FIG. 1 to FIG. 6D. First of all, FIG. 1 is a plan view schematically showing an optical pickup apparatus 100 of the embodiment.

The optical pickup apparatus 100 supports optical discs in compliance with, for example, the CD (Compact Disc) standard, the DVD (Digital Versatile Disc) standard and the BD (Blu-ray Disc) standard. The optical pickup apparatus 100 is made up by arranging an objective lens driving device 50 and various optical parts in a housing 51. A general function of the optical pickup apparatus is to read or write information from or to an optical disc by: irradiating an information recording layer of the optical disc with a laser beam in compliance with a predetermined standard; and receiving the laser beam reflected off this information recording layer.

The objective lens driving device 50 movably holds an objective lens holder (hereinafter referred to as an "OBL holder") 21. An objective lens 31, which supports any one or all of the standards, is attached to the OBL holder 21.

A laser unit 1 includes a laser diode. A laser beam in compliance with any one of the above-mentioned standards is emitted from this laser diode. To put it specifically, a laser beam with a bluish-violet (blue) wavelength range of 395 nm to 420 nm (for example, a wavelength of 405 nm) suitable for the BD, a laser beam with a red wavelength range of 645 nm to 675 nm (for example, a wavelength of 650 nm) suitable for the DVD, or a laser beam with an infrared wavelength range of 765 nm to 805 nm (for example, a wavelength of 780 nm) suitable for the CD is emitted from the laser diode.

The laser beam emitted from the laser unit 1 is separated into the zero-order beam, the plus first-order beam and the minus first-order beam by a diffraction grating 6, and is subsequently reflected by a semitransparent mirror 13. Thereafter, the resultant laser beam passes through a quarter-wavelength plate 9 and a collimator lens 12, as well as is reflected by a reflecting mirror, which is not illustrated. Afterward, the laser beam is focused on the information recording layer of the optical disc by the objective lens 31. Part of the laser beam emitted from the laser unit 1 is detected by a FMD 20 after passing through the semitransparent mirror 13. On the basis of this detection, the output of the laser unit 1 is adjusted.

The laser beam, as a return beam reflected off the information recording layer of the optical disc, passes through the reflecting mirror, the collimator lens 12, the quarter-wavelength plate 9 and the semitransparent mirror 13. Thereafter, an unnecessary astigmatism is removed from, and a desired astigmatism is added to, the laser beam by a first plate 16 and a second plate 19. Subsequently, the resultant laser beam is detected by an optical detector (PDIC) 17. On the basis of a signal detected by the optical detector 17, a control signal is supplied to a coil of the OBL holder 21, and a control current is supplied to focus coils, tracking coils or a tilt coil. As a result of this, a focus control, a tracking control and a radial tilt control are carried out. In this respect, the tilt coil is omitted from the objective lens driving device 50, which will be described later, because the focus coils each perform a function of a tilt coil combinedly.

A Dt direction, a Dr direction and a Df direction shown in FIG. 1 mean a tangential direction, a tracking direction (a radial direction of the optical disc) and a focus direction, respectively. These directions are orthogonal to one another.

Figure 2A:
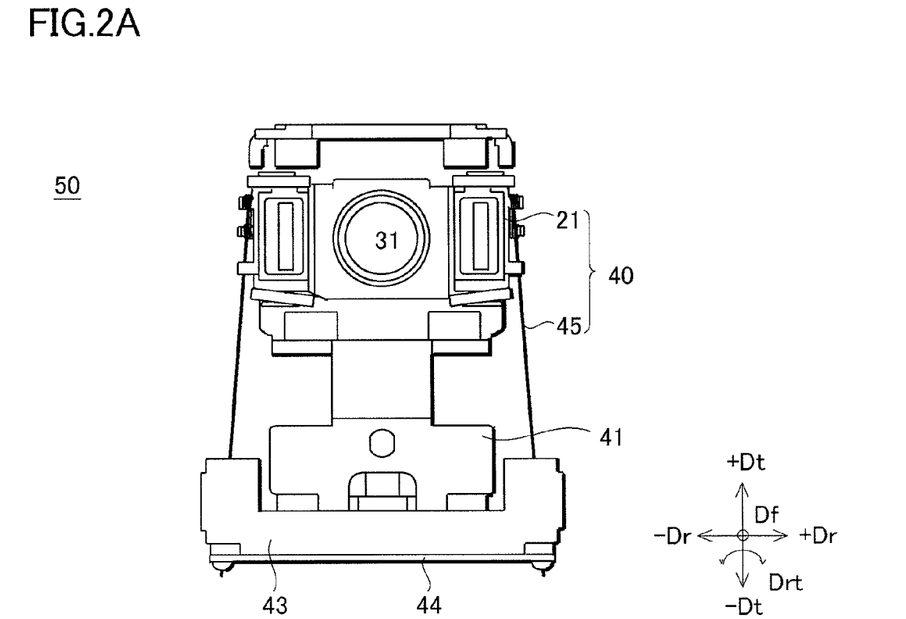
Figure 2B:
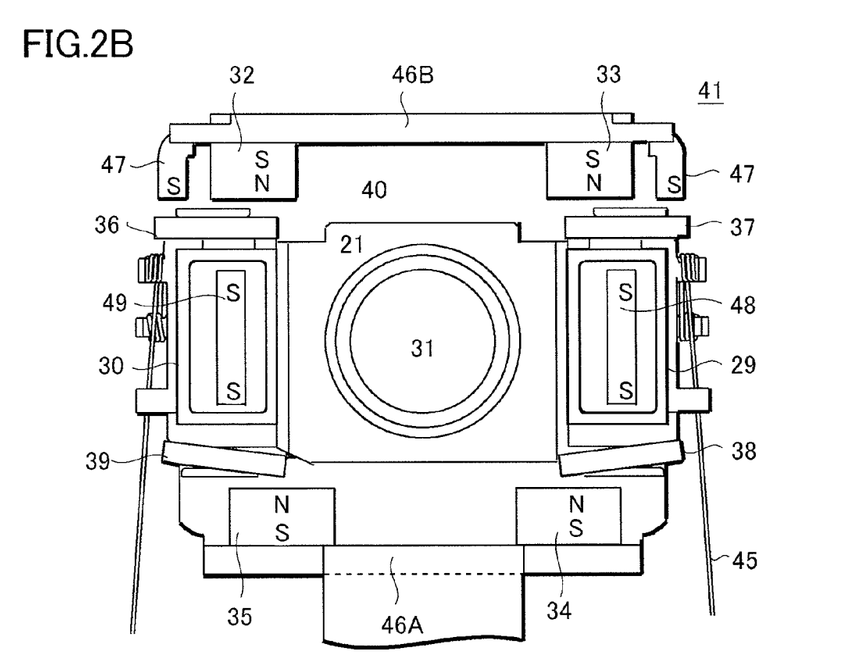
FIG. 2B is a plan view showing its part corresponding to an OBL holder in a magnified manner.

Referring to FIGS. 2A and 2B, descriptions will be provided for the objective lens driving device 50 installed in the optical pickup apparatus which have been described above. FIG. 2A is a plan view showing the entirety of the objective lens driving device 50; and FIG. 2B is a plan view showing its part corresponding to the OBL holder 21 in the magnified manner.

The objective lens driving device 50 includes an actuator movable unit 40 and an actuator frame 41. The actuator movable unit 40 includes the OBL holder 21 and support wires 45. The actuator frame 41 is made from a magnetic metal material such as a silicon steel plate. Various yokes, which will be described later, are formed by bending parts of the actuator frame 41 at a right angle.

The actuator movable unit 40 is elastically supported by the support wires 45 to be movable in the focus direction (the Df direction), the tracking direction (the Dr direction) and a radial tilt direction (a Drt direction) with respect to the actuator frame 41. One end of each support wire 45 is fixed to a sidewall of the OBL holder 21, and the other end of the support wire 45 is fixed to a fixture board 44 which is fixed to the actuator frame 41. The fixture board 44 is bonded to an auxiliary member 43 in which a damper material is filled for reducing vibration of the support wires 45. The fixture board 44, together with the auxiliary member 43, is screwed to the actuator frame 41. The support wires 45 mechanically support the actuator movable unit 40 in the air while three support wires 45, for example, are laid over each side surface of the actuator frame 41. In addition, the support wires 45 function as connector means through which electricity flows to the coils included in the actuator movable unit 40.

Referring to FIG. 2B, the actuator movable unit 40 mainly includes: the OBL holder 21; the objective lens 31 fixed to the upper surface of the OBL holder 21; tracking coils 36 to 39 wound around the respective outer surfaces of sidewall portions of the OBL holder 21; and focus coils 29, 30 built in the OBL holder 21.

Magnets 32 to 35 are placed on back yokes of the actuator frame 41 which face the tracking coils 36 to 39 placed in the outer sides of the sidewall portions of the OBL holder 21. To put it specifically, the tracking coil 39 and the tracking coil 38 are provided to sidewall portions which are lower ones of the OBL holder 21 in FIG. 2B; the magnet 35 is placed opposite to the tracking coil 39; and the magnet 34 is placed opposite to the tracking coil 38. On the other hand, the tracking coil 36 and the tracking coil 37 are provided to sidewall portions which are upper ones of the OBL holder 21 in FIG. 2B; the magnet 32 is placed opposite to the tracking coil 36; and the magnet 33 is placed opposite to the tracking coil 37.

The surfaces of the magnets 32 to 35, which are respectively opposite to the tracking coils 36 to 39, have the same polarity (for example, the N pole). The magnets 32 to 35 produce the effective magnetic fluxes over the effective areas of the tracking coils 36 to 39, respectively. Once the electric current is supplied to the tracking coils 36 to 39, this constitution moves the OBL holder 21 in the Dr direction due to the collaboration between the magnetic fields produced by the flow of the electricity through the tracking coils 36 to 39 and the magnetic circuits formed from the magnetic fields generated by the magnets 32 to 35.

The two focus coils 29, 30 each having a winding axis extending in the Df direction are placed in internal areas of the OBL holder 21 which are opposite to each other with the objective lens 31 in between. The magnets 32 to 35 produce the effective magnetic fluxes over the effective areas of the focus coils 29, 30 as well. Accordingly, once the electric current is supplied to the focus coils 29, 30, the OBL holder 21 is moved in the Df direction due to the collaboration between the magnetic fields produced by the flow of the electricity through the focus coils 29, 30 and the magnetic circuits formed from the magnetic fields generated by the magnets 32 to 35. It should be noted that in this embodiment, the OBL holder 21 is controlled in the tilt direction (the Drt direction) by giving a control signal for controlling the OBL holder 21 in the tilt direction to the focus coils 29, 30.

A back yoke 46A is a part formed by bending an end portion of the actuator frame 41 at a right angle. The magnets 35, 34 are fixedly attached to a side surface of the back yoke 46A which faces the OBL holder 21. The effective magnetic fluxes of the magnets 35, 34 can be strengthened by fixedly attaching the magnets 35, 34 to the back yoke 46A which, as described above, is made from the magnetic metal material.

Furthermore, a back yoke 46B is formed by bending another portion of the actuator frame 41 at a right angle. The magnets 32, 33 are fixedly attached to a side surface of the back yoke 46B which faces the OBL holder 21. In addition, sub-yokes 47 are provided by bending the two end portions of the back yoke 46B at a right angle when viewed in the Df direction. Thereby, the magnets 32, 33 are surrounded by the back yoke 46B and the sub-yokes 47. The sub-yokes 47 produce the magnetic fluxes which effectively act on the tracking coils 36, 37, respectively, by making the same magnetic pole (for example, the S pole) of the magnets 32, 33 in close contact with the back yoke 46B. Accordingly, the effective magnetic fluxes of the magnetic circuits formed with the magnets 32, 33 are strengthened.

Like the back yoke 46A and the like, opposed yokes 48, 49 are parts formed by bending portions of the actuator frame at a right angle. The opposed yokes 48, 49 are provided in locations where the opposed yokes 48, 49 are inserted into the focus coils 29, 30, respectively. This placement of the opposed yokes 48, 49 makes it possible to strengthen the effective magnetic fluxes which act on the focus coils 29, 30 and the tracking coils 36 to 39, and is accordingly effective in enhancing the sensitivity of the OBL holder 21 in the Df direction, the Dr direction and the Drt direction.

Figure 3A:
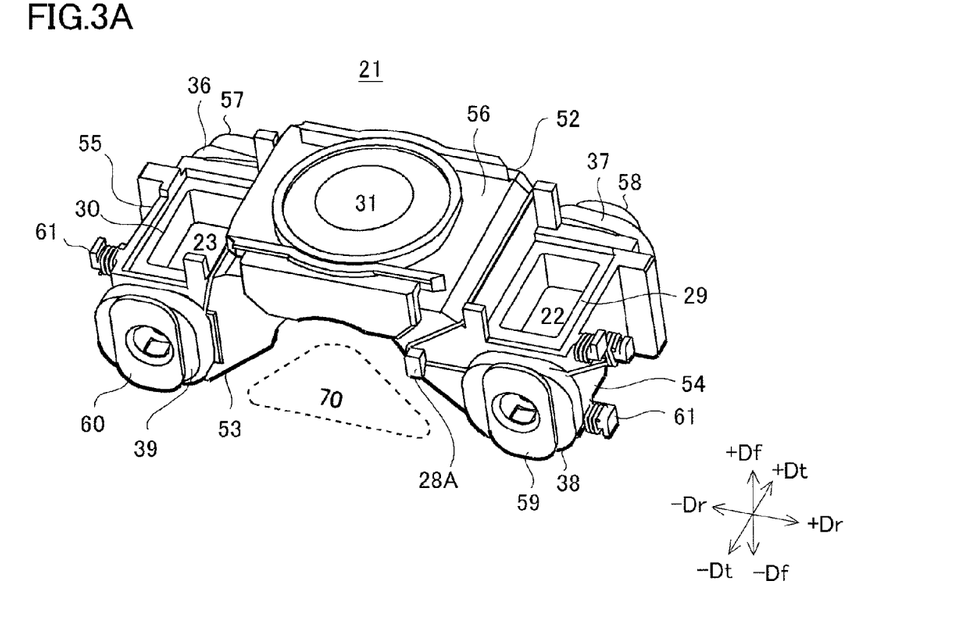
FIG. 3A is a perspective view of the objective lens holder.
Figure 3B:
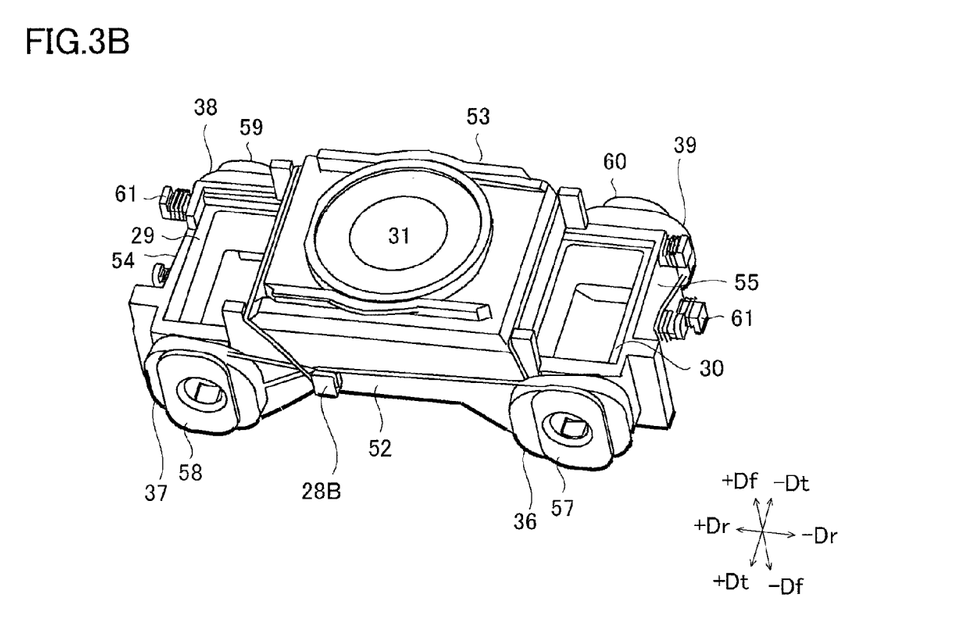
FIG. 3B is a perspective view of the objective lens holder which is looked at from a different viewpoint.

Referring to FIGS. 3A and 3B, descriptions will be provided for the constitution of the OBL holder 21 included in the actuator movable unit. FIG. 3A is a perspective view of the OBL holder 21 as provided with the coils. FIG. 3B is a perspective view showing the OBL holder 21 seen from a different viewpoint.

The OBL holder 21 is generally shaped like a housing having an opening in its lower portion. To put it specifically, the OBL holder 21 includes: a principal surface portion 56 provided with a circular opening to which the objective lens 31 is attached; and four sidewall portions integrally continuing downwards from the periphery of the principal surface portion 56. The sidewall portions include: a sidewall portion 52, in the backside of the drawing, extending in the long-side direction; a sidewall portion 53, in the front side of the drawing, opposed to the first sidewall portion 52; a sidewall portion 54 provided in the right side of the drawing, and extending in the short-side direction; and a sidewall portion 55 provided in the left end portion of the drawing. The principal surfaces of the sidewall portion 52 and the sidewall portion 53 are in parallel with the Dr direction, while the principal surfaces of the sidewall portion 54 and the sidewall portion 55 are vertical to the Dr direction.

Bobbins 57, 58 are provided to outer portions of the principal surface of the sidewall portion 52. The tracking coils 36, 37 are wound around these bobbins, respectively. In addition, bobbins 59, 60 are provided to outer portions of the principal surface of the sidewall portion 53. The tracking coils 38, 39 are wound around these bobbins, respectively. In this embodiment, the bobbins 57 to 60 are placed in end portions which are outward of the objective lens 31 in the Dr direction. The reason for this is that when the OBL holder 21 is installed in the small optical pickup, the reflecting mirror needs to be placed immediately under the objective lens 31, and a space 70 (FIG. 3A) for securing the optical path for the reflecting mirror needs to be provided in an area extending downward from the middle of the sidewall portion 52 or the sidewall portion 53 of the OBL holder 21, so that no margin for containing parts such as the coils is available in this area.

The tracking coils 36 to 39 wound around the respective bobbins are made from a length of conducting wire whose surface is covered with an insulating coat, such as an enameled wire. One end of the wire is tied around one of binding portions 61 formed by projecting parts of the sidewall portion 54, and the other end of the wire is tied around one of the other binding portions 61 provided to the sidewall portion 55. In this respect, the tracking coils 36 to 39 have a winding axis extending in the Dt direction, and are wound around the respective bobbins 57 to 60 to be each, as a whole, shaped like a square whose corners are rounded.

Three binding portions 61 are placed on the sidewall portion 54. The two ends of the conducting wire forming the focus coil 29 are respectively tied around two of the binding portions 61. One end of the tracking coils 36 to 39 is tied around the remaining one of the three binding portions 61.

Similarly, the other three binding portions 61 are provided to the sidewall portion 55. The two ends of the conducting wire forming the focus coil 30 are respectively tied around two of the other three binding portions 61. The other end of the tracking coils 36 to 39 is tied around the remaining one of the other three binding portions 61. The support wires 45 shown in FIGS. 2A and 2B are respectively connected to the conducting wires which are wound around these binding portions.

The focus coils 29, 30 are housed in the OBL holder 21. The focus coil 29 is placed in a housing area 22 which is provided to an end portion of the OBL holder 21 which is closer to the sidewall portion 54, and the focus coil 30 is placed in a housing area 23 which is provided to an end portion of the OBL holder 21 which is closer to the sidewall portion 55. Thereby, the focus coils 29, 30 are placed outward of the objective lens 31 in the Dr direction. The reason why the housing areas 22, 23 for housing the focus coils 29, 30 are provided in the end portions outward of the outer peripheral end portions of the objective lens 31 is the same as the reason why the bobbins 57 to 60 are placed in their respective end portions. In this respect, the size of the housing areas 22, 23 in the plan view is set equal to or slightly larger than the size of the focus coils 29, 30 which are housed in the housing areas 22, 23.

In addition, the focus coils 29, 30 have a winding axis extending in the Df direction, and are each made by winding a conducting wire in a way that makes each of the focus coils 29, 30 as a whole shaped like a square whose corners are rounded. In this respect, the tracking coils 36 to 39 are directly wound around the respective bobbins 57 to 60 which constitute parts of the OBL holder 21, whereas the focus coils 29, 30 are prepared in a state of being wound and are fixedly attached to the inside of the OBL holder 21 by use of an adhesive. Furthermore, although not illustrated, protrusions for the focus coils 29, 30 to be housed in the respective predetermined locations are provided inside the OBL holder 21.

In this embodiment, as described above, the tracking coils 36 to 37 are formed by winding one conducting wire around the bobbins 57 to 60. Accordingly, a part of the conducting wire between each two of the bobbins is placed laid along the sidewall of the OBL holder 21. For this reason, when the part of the conducting wire placed along the sidewall of the OBL holder 21 become loosened and away from the sidewall, the trouble, which has been explained in the section discussing the problems to be solved by the invention, is likely to happen.

Against this background, the embodiment provides a conducting wire hook portion 28A (FIG. 3A) and a conducting wire hook portion 28B (FIG. 3B). Referring to FIG. 3A, the conducting wire hook portion 28A is the one which is formed by projecting a part of the sidewall portion 53 near the bobbin 59 outwards, and which part of the conducting wire (connecting wire portion) connecting the tracking coil 37 and the tracking coil 38 is hooked round. On the other hand, referring to FIG. 3B, the conducting wire hook portion 28B is the one which part of the conducting wire connecting the tracking coil 36 and the tracking coil 37 is hooked round or wound around. The hooking of the conducting wire round the conducting wire hook portions 28A, 28B prevents the wire connecting the tracking coils from rising from the OBL holder 21.

Figure 4A:
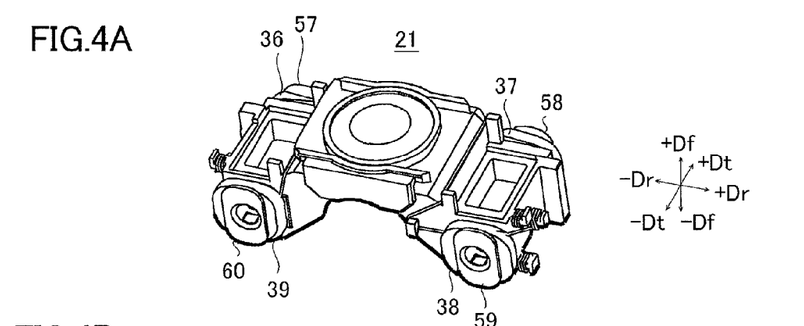
FIG. 4A is a perspective view showing the entirety of the objective lens holder.
Figure 4B:
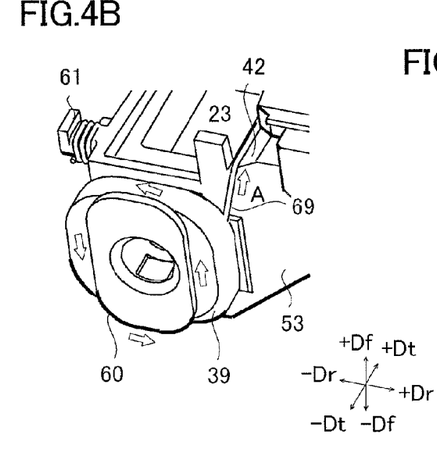
FIGS. 4B to 4E are magnified perspective views showing states in which tracking coils are wound around bobbins, respectively.
Figure 4C:
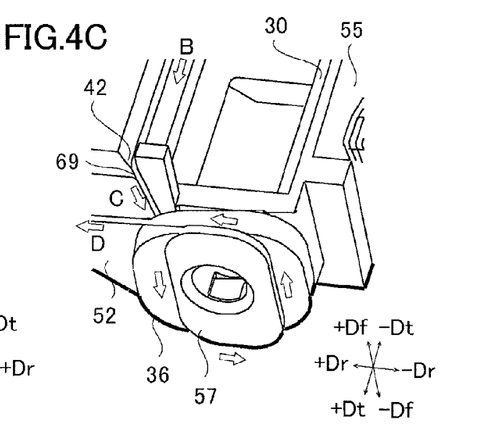
Figure 4D:
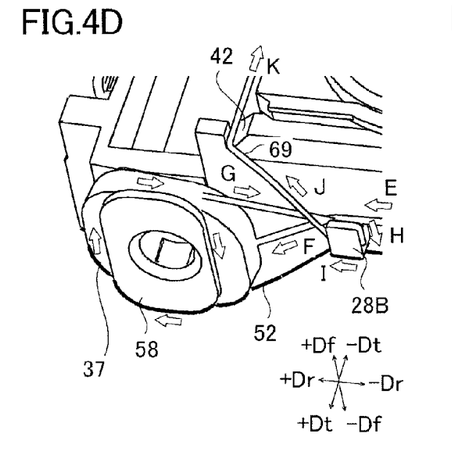
Figure 4E:
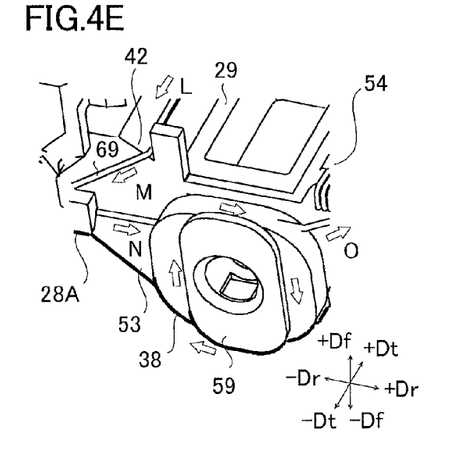

Referring to FIGS. 4A to 4E, descriptions will be provided for a specific method of hooking the conducting wire round the conducting wire hook portions 28A, 28B. FIG. 4A shows the OBL holder 21 as including all the tracking coils wound; FIG. 4B shows a part around which the tracking coil 39 is wound; FIG. 4C shows a part around which the tracking coil 36 is wound; FIG. 4D shows a part around which the tracking coil 37 is wound; and FIG. 4E shows a part around which the tracking coil 38 is wound. As described above, the conducting wire is wound around the tracking coils in the order of the tracking coil 39, the tracking coil 36, the tracking coil 37, and the tracking coil 38.

Referring to FIG. 4B, an end of the conducting wire 69, made from enameled wire or the like, is tied around the binding portion 61, and is then wound around the bobbin 60 counterclockwise to form the tracking coil 39. In this respect, the winding of the conducting wire 69 is achieved by moving a winding nozzle (not illustrated), from whose front end the conducting wire 69 is supplied, around the bobbin 60.

After completing the winding of the tracking coil 39, the conducting wire 69 is drawn out from an inner end portion of the bobbin 60 (end portion thereof in the +Dr direction), and the winding nozzle is moved to the bobbin 57 (through a path A). In this respect, a cut 42 is provided by cutting away an end portion of the sidewall portion 53 which is a portion corresponding to a portion above the tracking coil 39. The cut 42 is the one for fixing the position of the conducting wire 69. The inner side surface of the cut 42 is an inclined surface, and the outer side surface of the cut 42 is a surface in parallel with the Df direction. In addition, part of the conducting wire 69 between the bobbins is placed in close contact with the sidewall of the OBL holder 21. This constitution is the case with the other cut.

Referring to FIG. 4C, the conducting wire 69 laid along the sidewall portion (though a path B) passes through the cut 42, and is thereafter wound around the bobbin 57 counterclockwise from the inner side of the bobbin 57 (end portion thereof in the +Dr direction). After completing this winding, the conducting wire 69 is drawn out from an upper portion of the bobbin in the +Dr direction (through a path D).

Referring to FIG. 4D, subsequently, the conducting wire 69 is hooked on an upper portion of the conducting wire hook portion 28B (through paths E, F), and is thereafter wound around the bobbin 58 clockwise to form the tracking coil 37. After completing this winding, the conducting wire 69 is temporarily drawn out in the —Dr diction (through a path G), and is wound around the conducting wire hook portion 28B once (through paths H, I), as well as is laid toward the next bobbin via the cut 42 (through paths J, K). Referring to FIGS. 6A to 6D, descriptions will be provided for the reason why, as described above, the conducting wire 69 is wound around the conducting wire hook portion 28B or handled in a similar manner. In addition, part of the conducting wire 69 in the path E is pressed towards the sidewall portion 52 by crossing part of the conducting wire 69 in the path J. This prevents the part of the conducting wire 69 in the path E from rising.

Referring to FIG. 4E, the conducting wire 69 passing through a path L and the cut 42 extending along the sidewall of the OBL holder (through the path L) is hooked round the conducting wire hook portion 28A, and thereby passes through bent paths (paths M, N). Subsequently, the tracking coil 38 is formed by winding the conducting wire 69 around the bobbin 59 clockwise. After completing this winding, the other end of the conducting wire 69 is tied around the binding portion (not illustrated) which is provided to the sidewall portion 54 (through a path O).

As described above, no conducting wire hook portion is formed either in the side of the tracking coil 39 or in the side of the tracking coil 36, and the part of the conducting wire 69 formed into these tracking coils is laid straight along the cut 42 from their bobbins. The reason for this is that: referring to FIG. 4B, the part of the conducting wire 69 formed into the tracking coil 39 is drawn out from the inner side of the bobbin 60 (end portion thereof in the +Dr direction), and an angle between the path A and the Df axis is accordingly smaller; and thereby, the process of winding the conducting wire 69 by the winding nozzle is made easier.

As for the tracking coil 36, similarly, referring to FIG. 4C, the conducting wire 69 passing through the path B is wound around the bobbin 57 from the inner side of the bobbin 57 (end portion thereof in the +Dr direction) after passing through the path C. An angle between the path C and the Df axis is smaller, and the winding process by the winding nozzle is accordingly easier. For these reasons, no conducting wire hook portion is provided on the path from the cut 42 to the bobbin 57.

On the other hand, referring to FIG. 4D, the conducting wire 69 wound around the bobbin 58 is drawn out from the outer side of the bobbin 58 (end portion thereof in the +Dr direction) to the cut 42. For this reason, if the conducting wire 69 is drawn out without taking any measure, part of the conducting wire 69 between the bobbin 58 and the cut 42 would become away from the sidewall of the holder. With this taken into consideration, the embodiment provides the conducting wire hook portion 28B in a location inward of the bobbin 58 (in the —Dr direction), and makes the conducting wire wound around the conducting wire hook portion 28B. Thereby, the conducting wire 69 is put into close contact with the sidewall portion 52 in the paths (the paths G, H, I, J) from the bobbin 58 to the cut 42. Furthermore, the conducting wire hook portion 28B is placed spaced away by 1.2 mm or more from the inner side of the bobbin 58 (end portion thereof in the —Dr direction) for the purpose of avoiding the contact of the conducting wire hook portion 28B with the winding nozzle for winding the tracking coil 37.

Moreover, referring to FIG. 4E, when the tracking coil 38 is formed around the bobbin 58, the conducting wire 69 is wound around the bobbin 59 from the outer side of the bobbin 59 (end portion thereof in the +Dr direction), as in the case shown in FIG. 4D. With this taken into consideration, the conducting wire hook portion 28A is provided in order for part of the conducting wire 69 in the path between the cut 42 and the bobbin 59 not to become away from the sidewall portion 53. Accordingly, when the conducting wire 69 is hooked round the conducting wire hook portion 28A after passing through the cut 42 from the path L, the conducting wire 69 is wound around the bobbin 59 after following the bending paths M, N. As in the case described above, the conducting wire hook portion 28A is spaced away by 1.2 mm or more from the end portion of the bobbin 59 in the —Dr direction for the purpose of avoiding the contact of the conducting wire hook portion 28A with the winding nozzle.

Figure 5:
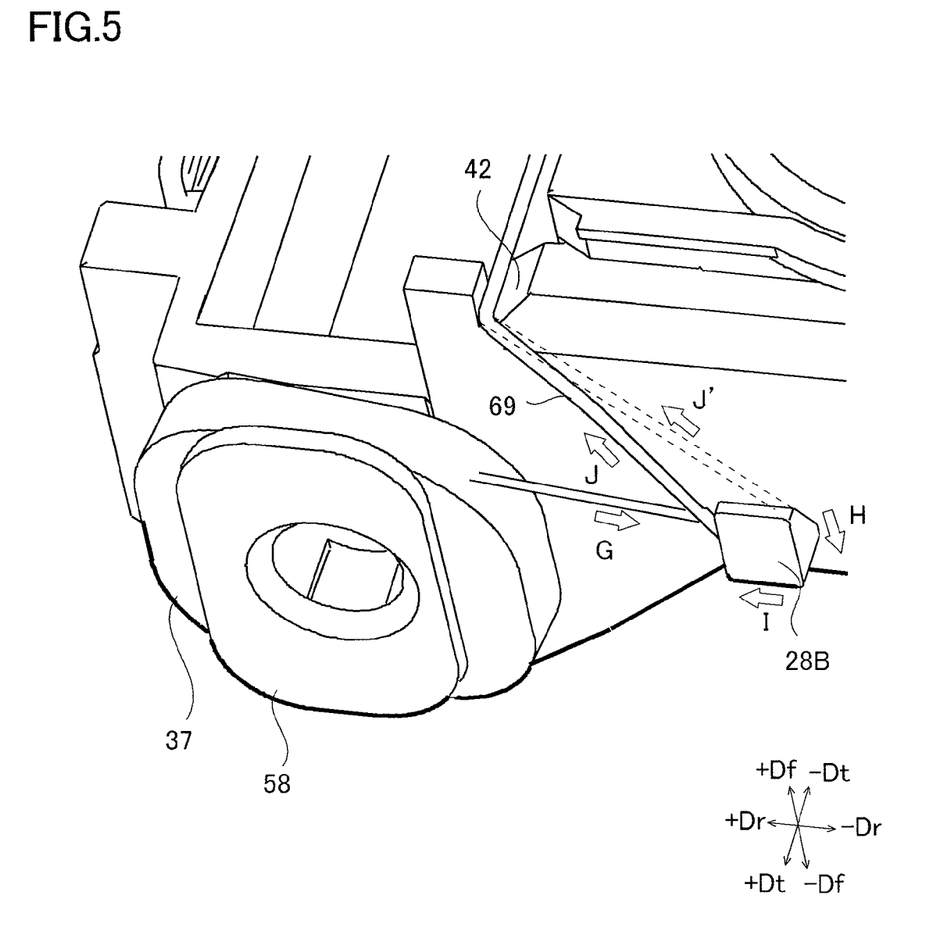
FIG. 5 is a perspective view showing how a conducting wire is hooked round a conducting wire hook portion in the objective lens holder of the preferred embodiment of the invention.

Referring to FIG. 5, detailed descriptions will be provided for the constitution in which the conducting wire 69 is wound around the conducting wire hook portion 28B. In this embodiment, the conducting wire 69 is stably laid in the path from the bobbin 58 to the cut 42 by winding the conducting wire around the conducting wire hook portion 28B at least once. To put it specifically, in a case where the conducting wire 69 is only hooked round the conducting wire hook portion 28B in this path, the path from the conducting wire hook portion 28B to the cut 42 becomes a path J' which is indicated with dotted lines. In this case, a defect is likely to take place as a result of the conducting wire 69 going out of the cut 42 in the —Dr direction when an error occurs in the position of the winding nozzle for laying the conducting wire 69. For this reason, in the embodiment, the conducting wire 69 is laid toward the cut 42 (through the path J) after wound round the conducting wire hook portion 28B clockwise. Because this makes an angle between the path J and the Df axis smaller than otherwise, the conducting wire 69 does not go out of the cut 42.

Figure 6A:
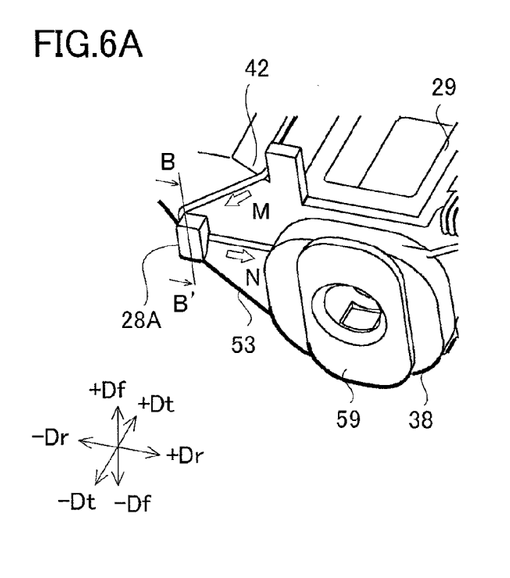
FIGS. 6A and 6B are, respectively, a perspective view and a cross-sectional view showing how a conducting wire is hooked round a conducting wire hook portion in the objective lens holder of the preferred embodiment of the invention.
Figure 6B:
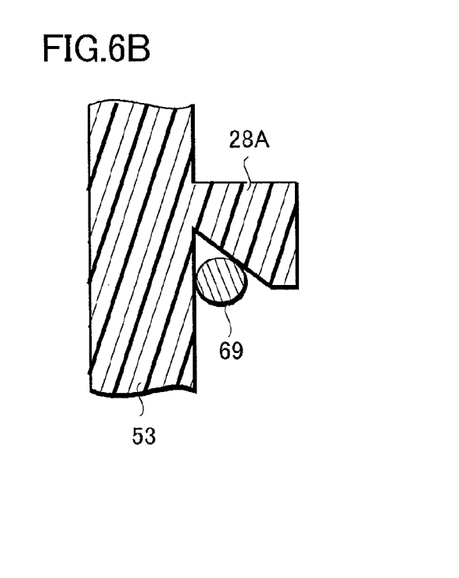
Figure 6C:
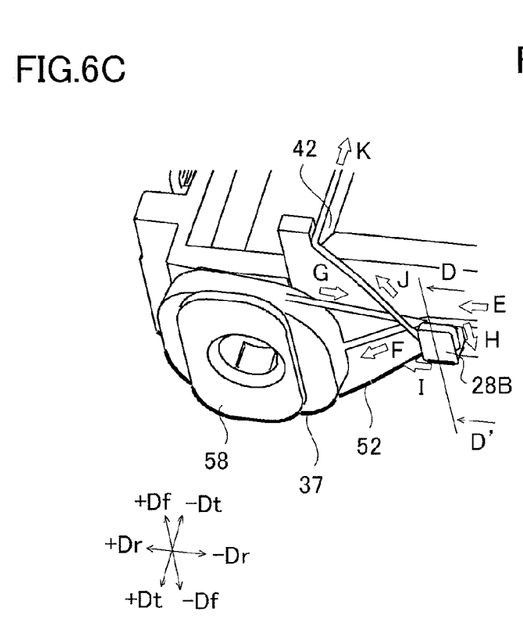
FIGS. 6C and 6D are, respectively, a perspective view and a cross-sectional view showing how the conducting wire is hooked round another conducting wire hook portion.
Figure 6D:
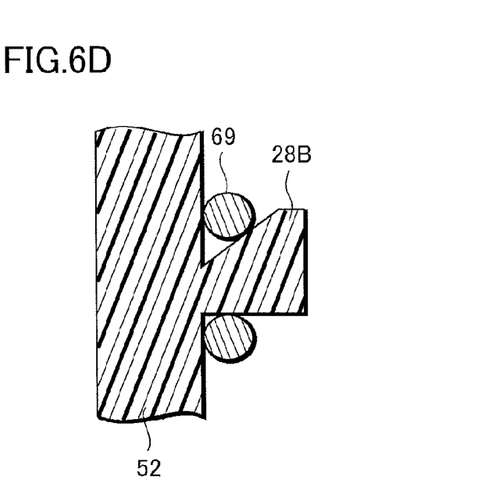

Referring to FIGS. 6A to 6D, descriptions will be further provided for the shapes of the respective conducting wire hook portions. FIGS. 6A and 6B are diagrams showing the shape of the conducting wire hook portion 28A; and FIGS. 6C and 6D are diagrams showing the conducting wire hook portion 28B.

Referring to FIGS. 6A and 6B, the conducting wire hook portion 28A is the one which is formed by projecting a part of the sidewall portion 53 outwards. The undersurface of the conducting wire hook portion 28A is an inclined surface whose inner part is cut into the conducting wire hook portion 28A upwards. In this part, an angle of a corner between the undersurface of the conducting wire hook portion 28A and the outer surface of the sidewall portion 53 is an acute angle. By this, a space is formed in an inner side of the lower portion of the conducting wire hook portion 28A, and the conducting wire 69 is contained in this space. Accordingly, the conducting wire 69 is hooked while put in close contact with the sidewall portion 53. In addition, the conducting wire 69 becomes less likely to come off the conducting wire hook portion 28A.

Referring to FIG. 6D, an inner side of the upper surface of the conducting wire hook portion 28B is an inclined surface which inclines downwards. Part of the conducting wire 69 in the path E, which is shown in FIG. 6C, is hooked round this part. In addition, part of the conducting wire 69 between the bobbin 58 and the cut 42 is wound around the conducting wire hook portion 28B. Accordingly, the conducting wire hook portion 28B has a function of correcting the parts of the conducting wire 69 in the two respective paths (i.e., the path from E through F, and the path from G through J).

In this respect, the above-described embodiment may be modified as follows. To put it specifically, referring to FIGS. 4A to 4E, changes may be made to the locations in which the respective conducting wire hook portions are provided. In other words, referring to FIGS. 4A to 4E, in this case, the conducting wire hook portion 28B shown in FIG. 4D is instead provided near the bobbin 57 (FIG. 4C), and the conducting wire 69 is hooked round the conducting wire hook portion 28B in the same manner as described above. In addition, the conducting wire hook portion 28A shown in FIG. 4E is instead provided near the bobbin 60 (FIG. 4B), and the conducting wire 69 is hooked round the conducting wire hook portion 28A in the same manner as described above. In this case, the direction in which the conducting wire is wound around each bobbin is reversed as well. Such a constitution brings about effects which are the same as those described above.

EFFECTS OF THE INVENTION

In the preferred embodiment of the invention, the conducting wire hook portions formed by projecting the parts of the sidewall portions are provided near the bobbins around which the tracking coils are wound, and the conducting wire formed into the tracking coils is hooked round the conducting wire hook portions. For this reason, the hooking of the conducting wire round the conducting wire hook portions makes the conducting wire get in close contact with the surfaces of the lens holder. This resultantly prevents the conducting wire, which would otherwise become loosened while in use, from getting in contact with the outside and accordingly causing a malfunction. In addition, this prevents the winding nozzle for winding the conducting wire around the bobbins from getting into contact with the conducting wire.

What is claimed is:

1. An objective lens holder comprising:
sidewall portions continuing from a principal surface portion to which an objective lens is fixed;
a first bobbin, a second bobbin, a third bobbin and a fourth bobbin projecting from the sidewall portions sideward;
a first tracking coil, a second tracking coil, a third tracking coil and a fourth tracking coil, each of the tracking coils comprising a conducting wire wound around a corresponding bobbin; and
a conducting wire hook portion projecting from a part of the sidewall portion sideward near at least one of the first bobbin, the second bobbin, the third bobbin and the fourth bobbin,
wherein the sidewall portions include a first sidewall portion, a second sidewall portion, a third sidewall portion and a fourth sidewall portion, the first and second sidewall portions being opposed to each other in a first direction, and the third and fourth sidewall portions being opposed to each other in a second direction orthogonal to the first direction,
the first bobbin and the fourth bobbin are provided to the first sidewall portion,
the second bobbin and the third bobbin are provided to the second sidewall portion,
the first tracking coil, the second tracking coil, the third tracking coil and the fourth tracking coil are formed by winding the conducting wire around the first bobbin, the second bobbin, the third bobbin and the fourth bobbin in this order, respectively,
the conducting wire is hooked on the conducting wire hook portion provided near each of the third tracking coil and the fourth tracking coil, and
a direction in which the conducting wire is wound for the first tracking coil and the second tracking coil is opposite to a direction in which the conducting wire is wound for the third tracking coil and the fourth tracking coil.

2. An objective lens holder comprising:
sidewall portions continuing from a principal surface portion to which an objective lens is fixed;
a first bobbin, a second bobbin, a third bobbin and a fourth bobbin projecting from the sidewall portions sideward;
a first tracking coil, a second tracking coil, a third tracking coil and a fourth tracking coil, each of the tracking coils comprising a conducting wire wound around a corresponding bobbin; and
a conducting wire hook portion projecting from a part of the sidewall portion sideward near at least one of the first bobbin, the second bobbin, the third bobbin and the fourth bobbin,
wherein the conducting wire is hooked on the conducting wire hook portion so that the conducting wire connects one of the tracking coils to another electric component of the objective lens holder through the conducting wire hook portion, and
a side surface of the conducting wire hook portion on which the conducting wire is hooked is an inclined surface inclined to a side surface of the corresponding sidewall portion in such a way that an acute angle is formed between an inner side of the side surface of the conducting wire hook portion and the side surface of the sidewall portion.

3. An objective lens holder comprising:
sidewall portions continuing from a principal surface portion to which an objective lens is fixed;
a first bobbin, a second bobbin, a third bobbin and a fourth bobbin projecting from the sidewall portions sideward;

a first tracking coil, a second tracking coil, a third tracking coil and a fourth tracking coil, each of the tracking coils comprising a conducting wire wound around a corresponding bobbin; and a conducting wire hook portion projecting from a part of the sidewall portion sideward near at least one of the first bobbin, the second bobbin, the third bobbin and the fourth bobbin, wherein the conducting wire is hooked on the conducting wire hook portion so that the conducting wire connects one of the tracking coils to another electric component of the objective lens holder through the conducting wire hook portion, the sidewall portions include a first sidewall portion, a second sidewall portion, a third sidewall portion and a fourth sidewall portion, the first and second side wall portions being opposed to each other in a first direction, and the third and fourth sidewall portions being opposed to each other in a second direction orthogonal to the first direction, the first bobbin and the fourth bobbin are provided to the first sidewall portion;

the second bobbin and the third bobbin are provided to the second sidewall portion;

the first tracking coil, the second tracking coil, the third tracking coil and the fourth tracking coil are formed by winding the conducting wire around the first bobbin, the second bobbin, the third bobbin and the fourth bobbin in this order, respectively, the conducting wire is hooked on the conducting wire hook portion provided near each of the third tracking coil and the fourth tracking coil, a first conducting wire hook portion is provided to the second sidewall portion near the third bobbin, and a part of the conducting wire between the second bobbin and the third bobbin is hooked on the first conducting wire hook portion, and a part of the conducting wire between the third bobbin and the fourth bobbin is wound around the first conducting wire hook portion.

4. The objective lens holder according to claim 3, wherein a second conducting wire hook portion is provided to the first sidewall portion near the fourth bobbin, and a part of the conducting wire between the third bobbin and the fourth bobbin is hooked on the second conducting wire hook portion.

\* \* \* \* \*